United States Patent Office 3,059,808
Patented Oct. 23, 1962

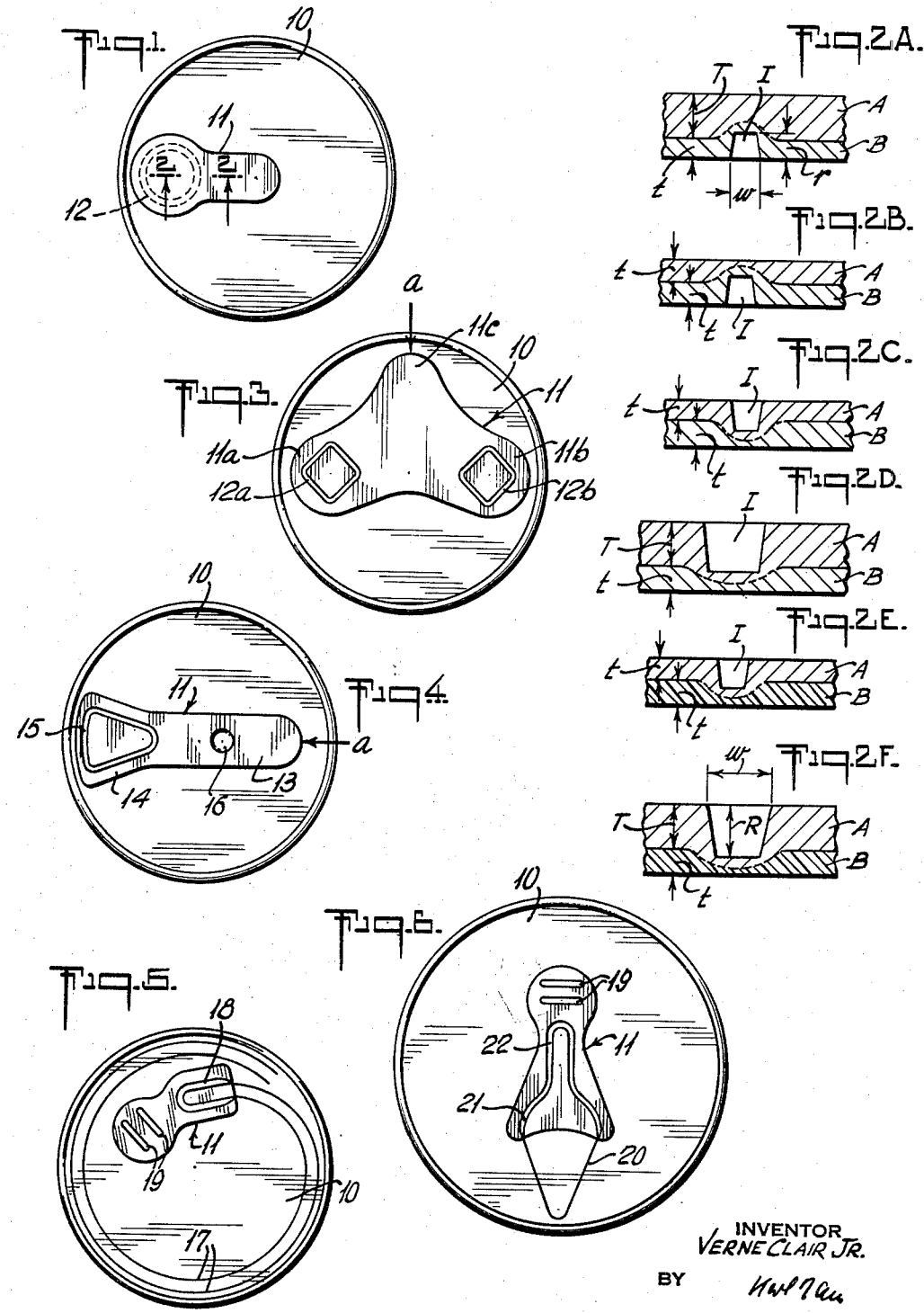

3,059,808
RIP TAG OPENING MEANS FOR
SEALED CONTAINERS
Verne Clair, Jr., New Hartford, N.Y., assignor to Kelsey-Hayes Company, 3600 Military Ave., Detroit, Mich., a corporation of Delaware
Filed June 20, 1960, Ser. No. 37,340
3 Claims. (Cl. 220—54)

This application is a continuation-in-part of application Serial No. 761,546, filed September 17, 1958, entitled, Rip Tag Opening Means for Sealed Metal Containers, now abandoned.

The present invention relates to rip or tearing tag opening devices for sealed containers, more particularly to an improved cold pressure welded rip or tearing tag or the like detachable container opening member of the general type disclosed by U.S. Patent No. 2,792,145.

There is shown and described in the aforementioned prior patent a rip tag container opening device consisting of cold pressure weldable metal, such as aluminum, said tag overlying a wall portion of a sealed container also consisting of cold pressure weldable material and being secured thereto by a closed linear or strip-like indentation pressure welded joint, such as a ring-shaped joint where a circular hole or opening is desired in the container wall. Due to the reduced metal thickness or cross-section at the weld line or area, as well as the work or pressure hardening of the impressed metal at the weld by the pressure applied during welding, compared with the adjoining non-indented areas, an opening conforming to the configuration or contour of the weld line will be torn in the container wall by severing or rupturing the container metal, upon pulling or forcefully tearing said tag off the container wall, substantially without the aid of a separate opening device, such as a key or the like opening implement.

In order to effect rupturing or tearing of the container metal, rather than of the tag and production of a hole in the latter, the aforementioned prior patent utilizes a single-sided so-called thick-thin weld of the type involving a weld indentation being effected through the relatively thinner of the two lapped members (container) and into the relatively thicker (tag) metal or member. Aside from the disadvantage that such a weld requires an indentation to be made upon the inside of the container wall and that the welding tool or indenter may cause a cutting of the relatively thin container material, in such a manner as to result in a considerable number of defective units or rejects, rip tag constructions of this type have been found to be practically limited to containers of relative soft material and to tags of relatively great thickness, in order to ensure a safe tearing of the hole or opening in the container wall.

On the other hand, prior attempts made and the prevailing trend to replace the conventional steel cans or containers, as used for the storage and shipment of foodstuffs and the like substances, by the more economical aluminum as container material have led to the conclusion, based on both practical and economic considerations and requirements, that the thickness of the container wall must be held to an absolute minimum in the interest of low price and shipping weight, on the one hand, and that the container metal should have an adequate hardness or mechanical strength, to withstand internal pressures, on the one hand, and to enable handling without the danger of damaging the containers, on the other hand.

The foregoing requirements have, in turn, led to considerable difficulties in the attempt to provide a satisfactory and reliable rip tag opener designed in accordance with the aforementioned prior patent, more specifically, to provide a rip or tearing tag which can be easily bent or lifted off the container wall by the average person without the danger of causing injury, and which can be pulled or torn off the container wall to produce an opening in the container with a minimum of effort and without the aid of a special opening tool or implement.

A further requirement for a successful and reliable rip tag container opening device of this type is that the opening is torn in the container wall positively and securely, or practically without failure, by tearing or rupturing of the container metal in preference of the tag metal and by the exertion of a minimum of effort on the part of the person opening the container.

In effecting a thick-thin indentation pressure weld as shown by the above prior patent, the use of a material having an adequate hardness would make it difficult to initially lift or bend the tag away from the container wall without a special tool and without involving the danger of injury to the user, while reducing the tag thickness to facilitate lifting or bending would involve the danger of tearing or rupturing of the metal of the tag rather than of the container, whereby to defeat the very purpose of a rip tag container opener of this type. These drawbacks and defects may be further demonstrated by assuming the tag thickness to be equal to the thickness of the container wall, in which case it has been found that the impressed member, or member on the side opposite to the welding tool or indenter, will always be torn in preference to the indented member, or member on the side of the indenting tool, that is, the tag in the case of a weld made from the inside of the container as shown by the above prior patent. In other words, a weld for a container opener of this type involves two conflicting requirements, one calling for a maximum or upper limit of the tag thickness, to ensure a safe and positive tearing or rupturing of the container wall, and the other calling for a minimum or lower limit of the tag thickness, to enable easy lifting of the tag off the container wall with a minimum of effort and without involving the danger of injury to the user.

For the foregoing and other reasons, which will become evident hereafter, the use of a rip tag opener according to the prior art is practically restricted to containers consisting of relatively soft aluminum or equivalenth ductile or cold pressure weldable material of limited hardness.

Accordingly, an important object of the present invention is the provision of a cold pressure welded rip tag or the like detachable container opening device for producing or tearing of an opening in a container wall positively and securely and with the expenditure of a minimum of effort on the part of the user in lifting the tag and tearing the same off the container wall.

Another object of the invention is the provision of a cold welded rip or tearing tag container opening device for producing or tearing an opening in a container wall positively and expeditiously by the average person, and without requiring the use of an additional opening aid in the form of an opening key or the like implement.

Yet another object of the invention is the provision of a cold pressure welded rip or tearing tag container opening device suitable for producing a pouring or dispensing opening in containers consisting of relatively hard cold pressure weldable material, substantially without requiring the use of any additional opening means.

Another object of the invention is the provision of a cold welded rip or tearing tag container opening device of the type described and suitable for use with containers consisting of material of relatively reduced thickness and relatively increased hardness, substantially without necessitating the use of any special opening tool or implement.

Still another object of the invention is the provision of a rip or tearing tag container opening device of the type described, being especially suitable for use with containers consisting of relatively thin cold pressure weldable metal of increased hardness and which can be used or operated safely and expeditiously by the average person by the exertion of a minimum of effort and without the use of a separate opening aid or implement.

The invention, as to the above and ancillary objects as well as novel aspects thereof, will be better understood from the following detailed description of a few practical examples for carrying the same into effect, taken in conjunction with the accompanying drawing forming part of this specification and wherein:

FIG. 1 shows the top wall of a cylindrical container being fitted with a rip tag opener of known type according to the prior art;

FIGS. 2A to 2F are enlarged cross-sections of various indentation pressure welded joints, being illustrative and explanatory of the improvements according to the invention;

FIGS. 3 and 4 illustrate, by way for example, practical tearing tag container opening devices constructed in accordance with the invention and being especially suitable for producing relatively small openings, such as pouring and venting holes, in a container wall; and FIGS. 5 and 6 are views similar to the foregoing and illustrating opening devices for producing relatively larger openings and embodying the use of the invention.

Like reference characters denote like parts in the different views of the drawing.

With the foregoing objects in view, the invention involves generally the provision of a tearing tag or the like detachable container opening member or device consisting of cold pressure weldable metal and being secured to the outside of a container wall portion also consisting of cold pressure weldable material by a single-sided indentation pressure weld effected through said tag and into the container wall. Principally, such a weld, assuming the tag and container to be of the same thickness and consisting of the same material or material of like hardness, would ensure a safe tearing or rupturing of the container metal under practically all circumstances. However, for containers of relatively thin and hard material required in view of practical and economic considerations, as pointed out hereinabove, the same difficulties are encountered as in the case of a weld according to the prior patent aforementioned, in an attempt of enabling an easy and safe lifting or bending of the tag prior to the tearing or opening operation. In order to avoid this drawback, in accordance with the improvement proposed by the present invention, the tag being welded from the outside to the container wall is made of a greater thickness and reduced hardness compared with the thickness and hardness of the container material, in such a manner as to enable both a safe and easy gripping and bending of the tag away from the container wall, on the one hand, and to ensure a positive and secure rupturing or tearing of the container metal in preference to the tag metal, to result in the production of a hole or opening in the container upon pulling the tag off the container wall, with a minimum of effort required, on the other hand.

In other words, the increased thickness of the tag compared with the thickness of the container wall is balanced by its reduced hardness, in such a manner as to provide the equivalent of identical tag and container members both with regard to hardness and thickness and to thereby ensure the impressed or container metal to be torn positively and reliably in accordance with the findings referred to herein, while allowing the tag to be lifted and the opening to be torn in the container wall without effort by or danger to the user and without requiring a special opening tool or implement.

As a consequence, the invention makes it possible to utilize a container metal of greatly reduced wall thickness and having an adequate strength or hardness, to reduce weight and to facilitate handling and shipping, while at the same time enabling easy and safe bending of the tag and pulling or tearing of a hole in the container wall by the average person. As will be understood, it is the latter characteristic and advantage, that is, the operation of the opening device by the average person and without the use of an opening implement, which distinguishes the rip tag opener according to the invention from conventional container opening means or devices which require a special effort and additional aids in the form of can openers, opening keys or the like implements for the opening of the sealed containers at present available on the market.

Referring more particularly to FIGS. 1 and 2A of the drawing, showing a rip tag opener of the type according to the above-mentioned prior patent, the numeral 10 represents the top wall of a cylindrical container, at least said top wall consisting of cold pressure weldable metal, such as aluminum, and having attached thereto by cold pressure welding a rip or tearing tag or the like detachable member 11 also consisting of cold pressure weldable material. In the example shown, the tag is connected to the container wall through a circular or ring-shaped indentation cold pressure welded joint 12, a cross-section through which is shown in greater detail and on an enlarged scale by FIG. 2A.

In the latter, A represents the tag having a thickness T which is at least twice the thickness $t$ of the container wall B, the weld indentation I, produced by means of a suitable pressure welding tool or indenter, being effected through the thinner or container metal (B) into the thicker or tag metal (A). Such a joint has become known as a thick-thin cold welded joint, as described in greater detail in the prior patent aforementioned.

In producing a single-sided indentation weld of this and similar type, it has been found necessary, in order to create an intense and adequate metal flow at the interface conducive to the joining of the members in a true solid phase welding bond, to cause the welding tool or indenter to pass through or traverse the first member, hereinafter referred to as the indented member for the purpose of this specification, that is, member B in case of FIG. 2A, and into the second member, hereinafter referred to as the impressed member, that is, member A according to FIG. 2A, or beyond the original interface between the members. This requirement has been found to exist irrespective of the relative thickness or other characteristics of the members to be joined in a single-sided solid phase or cold welded bond or joint.

It has further been found, in the case of a single-sided indentation lap weld of this type, that tearing or rupturing of either the member A or B, upon peeling or pulling apart the members, is dependent both upon the relative thickness and hardness of the materials of the members, as well as on the position relative to the welding indenter, that is, whether a member is indented or impressed according to the above definition. More particularly, the tendency to tear or become ruptured, upon peeling or tearing apart the two welded members, increases as the relative thickness as well as the relative hardness of the members is decreased, while the impressed member is always torn or ruptured in preference to the indented member due to the greater work or pressure hardening and reduction of the cross section of the impressed material at the weld area.

Thus, assuming, in the case of a rip tag construction according to FIG. 2A, the tag A and container wall B to be of the same thickness, as shown by FIG. 2B, tearing would occur of the tag or impressed member A, as follows from the foregoing. In order to counteract this effect or to promote and cause tearing of the member B or container wall, the thickness of member A must be increased considerably in order to insure a safe and secure tearing of the container wall B and to result in the production of an opening in the container in preference to the tearing of the tag A. It has been found that the tag thickness T, for this purpose, must be at least twice and preferably greater than the thickness of the container wall $t$, since there exists a relatively wide intermediate or neutral region of thickness ratios, where tearing of either member may occur, that is, where the counteracting tendencies of both members to tear or rupture the metal more or less balance one another.

A weld according to FIG. 1A is accordingly limited to relatively great tag thicknesses, compared with the thickness of the container wall, which renders this type of container opener unsuited for use with containers of relatively hard metal, without interfering with the easy and effective operation of the device by the average person, unless a special opening aid is used. On the other hand, use of a softer tag, to facilitate the opening operation, would result in the increase of the tendency to tear of the tag metal, or would necessitate the use of a tag of excessive thickness as to be prohibitive for practical reasons.

All the foregoing considerations contribute to the restriction of the use of a tearing tag according to FIGS. 1 and 2A to containers consisting of relatively soft material, such as containers made of aluminum having a low grade of hardness, whereby to substantially limit the practical usefulness of a container opening device of this type.

Aside from the foregoing drawbacks and shortcomings of the container opening devices of the prior art, there is the disadvantage of the weld indentation being located upon the inside surface of the container wall, this being objectionable or impractical for various reasons, such as in view of the provision of a special protective coating normally being applied to the inside of the container wall, to protect foods and the like substances stored in the containers.

In order to overcome the last-mentioned difficulty, the present invention makes use of an improved single-sided weld joint utilizing a weld indentation being effected from the outside of the container or through the tag and into the container wall. With such an arrangement, assuming the tag and container be of the same material the thickness of the tag to be equal to the thickness of the container wall, as shown by FIG. 2C, tearing or rupturing would be principally ensured of the container metal B under all circumstances, but again such a rip tag would be limited to relatively soft metal containers, in the interest of enabling an easy and effortless pulling or tearing of the tag and production of an opening in the container wall, in accordance with the principal object and purpose of the present invention. The same applies to a certain extent to a weld of this type using a tag of greater thickness (T) compared with the container wall thickness $(t)$, as shown in FIG. 2D of the drawing, in order to facilitate lifting and pulling of the tag in the case of containers made of relatively thin material.

In brief, all the arrangements according to FIGS. 2A to 2D utilizing a tag of the same metal or hardness as the container are practically limited to containers consisting of relatively soft materials, or materials of limited mechanical strength, whereby to be unsuitable for use in the majority of practical container or canning applications.

According to the present invention, the foregoing difficulties and defects are substantially eliminated or reduced to a minimum by the use of a relatively heavy tag consisting of a material having a lesser hardness than the container metal and having a greater thickness relative to the thickness of the container wall, in such a manner as to substantially balance the increased tendency to tearing as a result of the greater softness of the material of the tag. In other words, with the indentation being made through the thicker and softer (tag) metal into the thinner and harder (container) metal and with the increased tag thickness being substantially balanced by its reduced hardness in the manner according to the invention, there is obtained the equivalent of a single-sided weld between two members of the same thickness and hardness according to FIG. 2B of the drawing, thereby ensuring tearing of the impressed (container) member under all circumstances and for container material having any desired strength and minimum wall thickness. The invention will be further understood by reference to FIGS. 2E and 2F. In FIG. 2E, wherein the harder or container material B is represented by the closer hatching lines compared with the softer tag material A and wherein both members are assumed to have the same thickness $t$, the tendency of the impressed member B to tear in preference of the member A would be counterbalanced by the reduced hardness of the member A, whereby tearing may occur of the tag metal rather than of the container wall.

In the case of FIG. 2F showing the final construction according to the present invention, the effect of the reduced softness of member A in FIG. 2E is counterbalanced by an increased thickness (T) of the tag, in such a manner as to result in a positive and secure rupturing or tearing of the container wall and pulling of a hole or opening in the container safely and securely and substantially without failures or rejects. This makes it possible to use a container metal having a desired hardness of minimum thickness, to comply with practical and economic requirements, while ensuring both an easy and effortless tearing of the tag and production of an opening by the average person without the aid of a special opening tool.

For all practical purposes, it has been found that the hardness of the tag A and container B should be inversely related to the thickness of the members, whereby to result in an arrangement equivalent to that according to FIG. 2C and insuring a safe tearing of the impressed or container metal under all circumstances and free from the limitation to a relatively soft container material. As an example, the tag A in FIG. 2F may have a hardness equal to one half of the hardness of the container wall B and a tag thickness T being equal to about twice the container thickness $t$, to obtain satisfactory results in practice.

While in the case of the known rip tag construction according to FIG. 2A, the width $w$ and depth $r$ of the weld indentation I or tool penetration are determined by the thickness $t$ of the thinner (container) member, the width $w$ in the case of the inventive construction, FIG. 2F, is determined by the thickness T of the thicker or indented member, while the total percentage reduction R depends upon the total thickness $T+t$ of the members A and B. More specifically, for a thickness $w=1.5T$ the reduction R should be at least about 70% of the total $T+t$ for aluminum, or preferably higher to further improve the tendency of rupturing of the container metal or member B in preference to the tag metal or member A. While this increased reduction may result in a weld strength less than the optimum strength, such consideration is of secondary importance for a rip tag opener of the type forming the subject of the present invention, where the prime object and purpose to be achieved is an easy and safe tearing of an opening in the container wall, rather than the achievement of a weld joint or connection of maximum mechanical strength. For the same reason, by using a width $w=2t$ or greater, the percentage reduction R may be increased beyond the minimum of about 60% for achieving maximum weld strength, say to about 75% to obtain optimum results and efficiency of the tearing tag opener, assuming again a ratio of tag to container hardness of about 2:1.

While the hardness ratio may be varied within substantial limits to suit existing conditions and requirements, the thickness ratio $T:t$ is dependent upon the percentage reduction R in view of the fact pointed out hereinabove that the indentation I must be extended into the second or impressed member, to create an intense and adequate interfacial metal flow necessary for joining the members in a cold or solid phase welding bond.

According to one way of carrying the invention into effect, to produce a simple pouring hole or the like opening, FIG. 1 may be modified by the provision of a tag 11 having a thickness equal to about twice the thickness of the container wall 10 and consisting of a material of substantial lesser hardness than the container metal, said tag being welded to the container wall along the circular strip-like weld line or area 12 from the outside or through the tag material and into the container wall, in the manner shown and described in reference to FIG. 2F. As a consequence, the thickness of the container wall may be reduced to a minimum and the container material chosen to have an adequate hardness or mechanical strength compatible with practical canning as well as handling and shipping requirements, and substantially without impairment of the ease or facility of manual operation of the opener by the average person.

While there has been illustrated in the drawing a tearing tag for producing a circular or the like opening in the top wall of a cylindrical container or metal can, it will be understood that the new and improved technique and weld construction according to the invention applies with equal advantage to devices for producing openings of a different size or configuration in any portion of the wall of a container, whereby at least said wall portion consists of cold pressure weldable metal, preferably of aluminum.

Thus, FIG. 3 shows a construction of a tearing tag 11 according to the invention for producing both a pouring and a vent hole in the top 10, said tag having, in the example shown, three radial arms or portions 11a, 11b and 11c being spaced by equal angles from each other with the arms 11a and 11b being secured to the top wall 10 by square or otherwise shaped linear cold pressure welded indentation joints 12a and 12b constructed in accordance with FIG. 2F, and with the arm 11c serving as the tag proper to be pulled off in the direction of the arrow a, to produce a pair of holes in the container wall, one of which may serve as a pouring hole and the other may serve as a vent hole for dispensing the liquid contents stored in the container.

Another modification of a tearing tag construction according to the invention for simultaneously producing a pouring and a venting hole is shown in FIG. 4. According to this construction, the strip-like tag 11 has an outwardly flaring end portion 14 being cold pressure welded to the wall 10 along a triangular linear cold welded joint 15, on the one hand, and by a relatively small circular or the like spot weld 16, on the other hand. The latter is suitably spaced from the weld 15 in the tearing direction a of the tag coinciding with the symmetry axis of the triangle. As will be understood, the weld 16 may be of any other shape, such as square, oval etc. Since in producing relatively small openings, say of a cross-sectional dimension of less than about 0.25 inch, it may be difficult to weld a strip or line encircling the opening, the weld indentation may be made over the entire weld spot or area 16 the contour of which defines the tearing line or vent hole produced in the container wall 10, in addition to the pouring opening being defined by the outline of the weld 15.

Finally, the tearing tag construction of the invention may be advantageously used in connection with combined weld and score container opening devices for producing relatively large openings by means of a tag or reduced size, as described in the copending patent application Serial No. 762,469, filed September 22, 1958, entitled, Opening Means for Sealed Containers, now Patent No. 2,946,478, in the name of the present applicant as joint inventor. In an opening device of this type, the outline or contour of the opening produced in the container wall is determined in part by a linear cold welded indentation made through the tearing tag into the container wall, to provide a first indentation of said wall, and by a second or scoring indentation of said wall exterior of said tag and conforming to the remaining contour or outline portion of the opening to be produced, both said weld and scoring indentations smoothly merging into one another.

A score and weld tearing tag opener of the latter type is shown in FIG. 5. In the latter, numeral 17 indicates a pair of circular and parallel score lines of weakened cross-section of the container wall 10 being located closely adjacent to the edge of said wall, to define a tear strip therebetween, one pair of the adjacent ends of said lines gradually merging into the ends of the U-shaped weld indentation 18 of the tag 11, as more clearly described in the aforementioned copending application. In using a rip tag opening device of this type, lifting and pulling of the tag 11 off the container wall 10 causes a rupturing or severing of the container metal first along the weld joint 18, constructed for this purpose in the manner shown by FIG. 2F, and subsequently along the scoring line or tear strip 17. In order to facilitate bending or lifting of the tag 11, the latter may be advantageously provided with grooves or rips 19, while the tag metal may again be chosen to have a sufficient softness and thickness compared with the container wall 10, in the manner described hereinbefore. With an arrangement of this type, an opening equal to substantially the entire top wall 10 may be produced readily and with little effort, and without the use of any special opening means.

A modified construction of a combined weld and score tearing tag opener is shown by FIG. 6, the latter being designed to produce a combined opening and pouring hole comprising, in the example shown, a triangular pouring section defined by the scored portion 20 of the wall 10 and a cold welded section of the tag 11 having a curved portion 21, smoothly merging into the ends of the score line 20, and an inner straight venting section 22, to enable penetration of an adequate amount of air into the container during the pouring of the liquid contents. Again in this case, the weld 21, 22 is advantageously constructed in accordance with the present invention as shown by FIG. 2F, to ensure a safe and reliable tearing of an opening in a container made of a material of reduced thickness and adequate strength, in the manner described and understood from the foregoing. This renders this type of opening especially suitable for use in connection with beer, carbonaceous liquids and for all such containers involving the presence and/or generation of internal pressure in the container.

While the specific relation of the tag thickness and hardness to the thickness and hardness of the can material as given herein by way of example is intended to serve as a general guide in the design of rip tag openers according to the invention, this relation is by no means critical and may be varied within limits to suit existing conditions and requirements. In general, the hardness of the tag should be so related to the hardness of the container material as to compensate within a safe margin for any existing tendency or probability of tearing of the tag metal for a given ratio of tag thickness to container thickness.

In the foregoing, the invention has been described in reference to specific illustrative devices. It will be evident, however, that variations and modification, as well as the substitution of equivalent elements for those shown for illustration, may be made without departing from the broader scope and spirit of the invention as defined in the appended claims. The specification and drawing are accordingly to be regarded in an illustrative rather than in a restrictive sense.

I claim:

1. The combination with a sealed container having at least a wall portion consisting of cold pressure weldable metal, of a tearing tag or the like detachable container opening member also consisting of cold pressure weldable material and having a thickness of about twice the thickness of said wall portion and a hardness being about one half of the hardness of said wall portion, said member overlying the outside surface of said wall portion and having a fractional area being cold pressure welded to said wall portion by a single-sided weld indentation extending through said member and into said wall portion, to form a solid phase welding bond at said area, whereby to cause a severing of the container wall along the contour of said area, to produce an opening in the container, upon tearing said member off said wall portion.

2. The combination with a sealed container having at least a wall portion consisting of aluminum, of a tearing tag or the like detachable container opening member also consisting of aluminum and having a thickness of about twice the thickness of said wall portion and a hardness equal to about one half the hardness of said wall portion, said member overlying the outside surface of said wall portion and having a linear fractional area defining at least a portion of the outline of an opening to be produced in said container and being cold pressure welded to said wall portion by a single-sided weld line indentation extending through said member and into said wall portion, said indentation having a width equal to about twice the thickness of said member and a depth being about 75% of the total thickness of said member and said wall portion, to form a solid phase welding bond at said area, whereby to cause a severing of the container wall along said weld line, to thereby produce an opening in said container, upon tearing said member off said wall portion.

3. The combination with a sealed container having at least a wall portion consisting of aluminum, of a tearing tag or the like detachable container opening member also consisting of aluminum and having a thickness of about twice the thickness of said wall portion and a hardness equal to about one half of the hardness of said wall portion, said member overlying the outside surface of said wall portion and having a linear fractional area closed upon itself to define the outline of an opening to be produced in said container and being cold pressure welded to said wall portion by a single-sided weld line indentation extending through said member and into said wall portion, said indentation having a width equal to about twice the thickness of said member and a depth being about 75% of the total thickness of said member and said wall portion, to form a solid phase welding bond at said area, whereby to cause a severing of the container wall along said weld line, to thereby produce an opening in said container wall, upon tearing said member off said wall portion.

References Cited in the file of this patent

UNITED STATES PATENTS

| | | |
|---|---|---|
| 2,792,145 | Sowter | May 14, 1957 |
| 2,946,478 | Clair et al. | July 26, 1960 |